United States Patent [19]

Beckman

[11] 4,277,198

[45] Jul. 7, 1981

[54] FURNITURE JOINT CONSTRUCTION

[75] Inventor: Robert P. Beckman, Burlington, Iowa

[73] Assignee: Litton Business Systems, Inc., Burlington, Iowa

[21] Appl. No.: 46,265

[22] Filed: Jun. 7, 1979

[51] Int. Cl.³ .................... F16B 12/46; F16D 1/00; F16M 11/16
[52] U.S. Cl. .................................. 403/231; 248/188; 403/292
[58] Field of Search ............... 403/187, 188, 189, 231, 403/407, 169, 403, 292; 248/188

[56] References Cited

U.S. PATENT DOCUMENTS

| 2,037,736 | 4/1936 | Payne et al. | 403/187 X |
|---|---|---|---|
| 3,265,342 | 8/1966 | Brettner | 403/188 X |
| 3,884,002 | 5/1975 | Logie | 403/292 X |
| 3,966,339 | 6/1976 | Nemecek et al. | 403/292 |
| 3,979,098 | 9/1976 | Vattier | 248/188 |
| 4,032,242 | 6/1977 | Morris | 403/231 |
| 4,124,186 | 11/1978 | Call | 403/231 X |
| 4,137,115 | 1/1979 | Lambert | 403/292 X |

Primary Examiner—Louis Rimrodt
Attorney, Agent, or Firm—Michael H. Wallach; Robert F. Rotella

[57] ABSTRACT

A furniture joint construction including a generally box-like brace member, the various walls of which are secured to respective different furniture members.

10 Claims, 5 Drawing Figures

FURNITURE JOINT CONSTRUCTION

BACKGROUND OF THE INVENTION

1. Field of the Invention

This invention relates to the construction of a furniture joint, especially in wooden furniture. More specifically it relates to the use of a novel brace member providing a new and improved joint construction.

2. Description of the Prior Art

It is conventional to provide in wooden furniture various cleat or brace devices to provide proved rigidity and strength. Such devices may be in the form of a block of wood or a right angle-shaped metal member.

SUMMARY OF THE INVENTION

In accordance with the present invention, there is provided a novel form of bracing member especially for bracing a wooden table or desk having a top, side rails, and legs. In a preferred form of the invention, the brace comprises a box-like member with various side walls which are adapted to be secured by screwing to the different adjacent members to be braced. Such an arrangement using the bracing member of the invention provides a more rigid and stronger structure than was available in the prior art.

Additionally, there may be used in conjunction with the box-like brace member a plate having mounted thereon a dowel pin which extends into the leg of the furniture and thereby further strengthens and rigidifies it.

It is therefore a primary object of the invention to provide an improved furniture joint construction.

It is a further object to provide an improved joint construction by providing a novel form of bracing member.

It is a further object to provide in a furniture joint construction a novel brace member which gives improved strength and rigidity characteristics to the joint.

The above and other objects, advantages, and features of the invention will become apparent to those of ordinary skill in the art from the following detailed description of a specific embodiment of the invention when read in conjunction with the accompanying drawings, in which:

DETAILED DESCRIPTION OF A SPECIFIC EMBODIMENT

Figure 1:
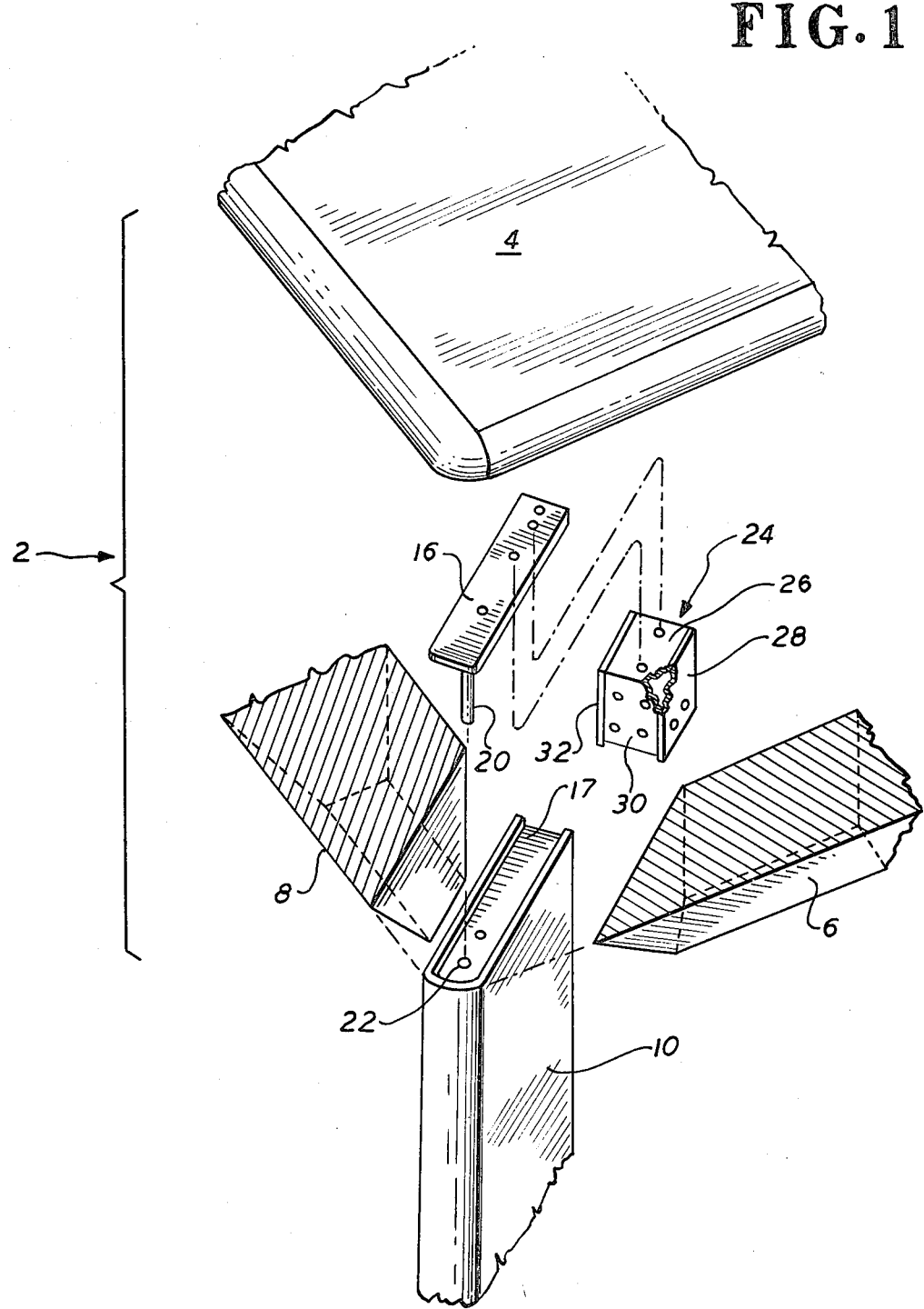
FIG. 1 is an exploded perspective view of a furniture joint construction of the invention.
Figure 2:
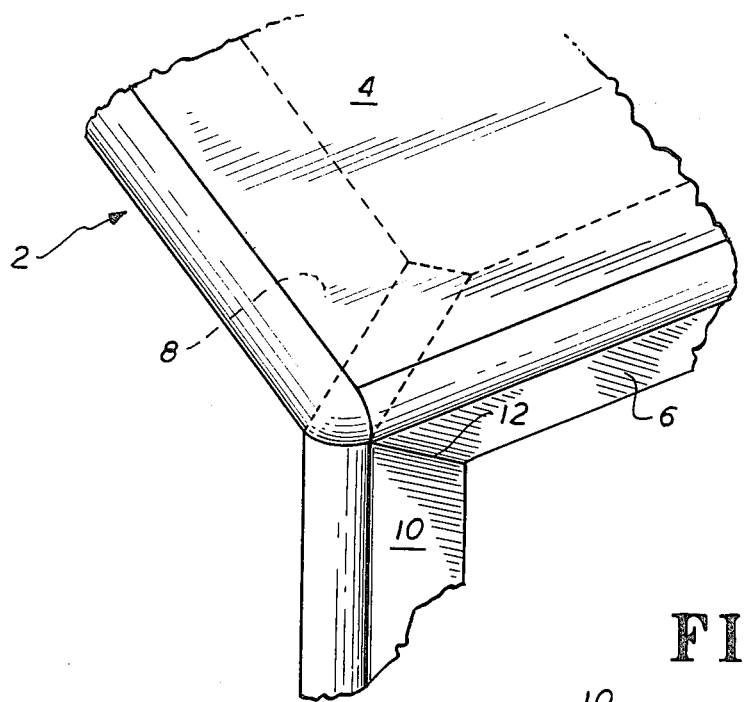
FIG. 2 is a front perspective view showing the joint fully assembled.

In the drawings, there is shown one corner of an article 2 of wooden furniture, which may be a table, desk, etc. It comprises a top 4, rails 6 and 8 depending from the top and secured thereto as by being glued along their uppermost faces to the undersurface of the top 4, and a depending leg 10.

Figure 3:
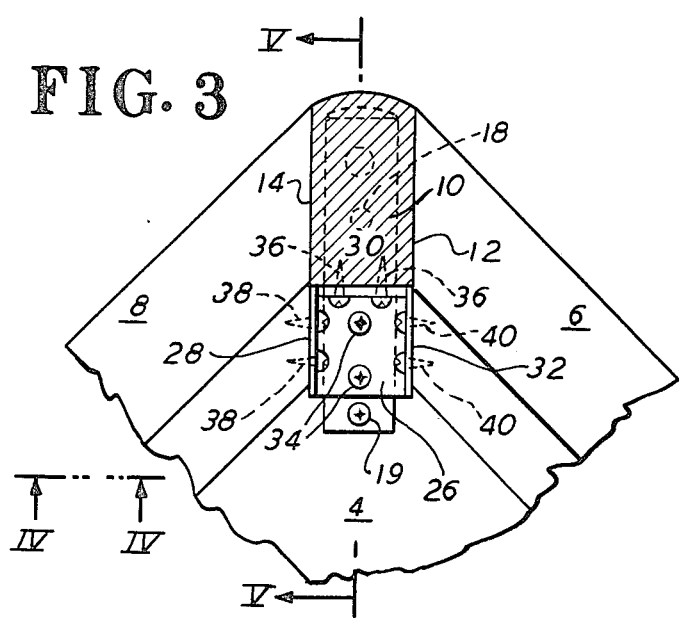
FIG. 3 is a bottom plan view of the joint.
Figure 5:
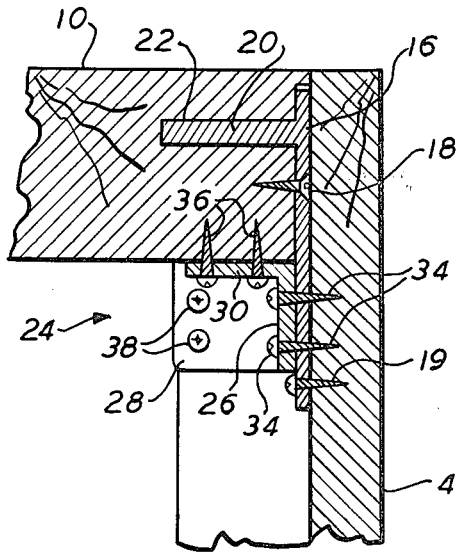
FIG. 5 is a sectional view taken on line V—V of FIG. 3.
Figure 4:
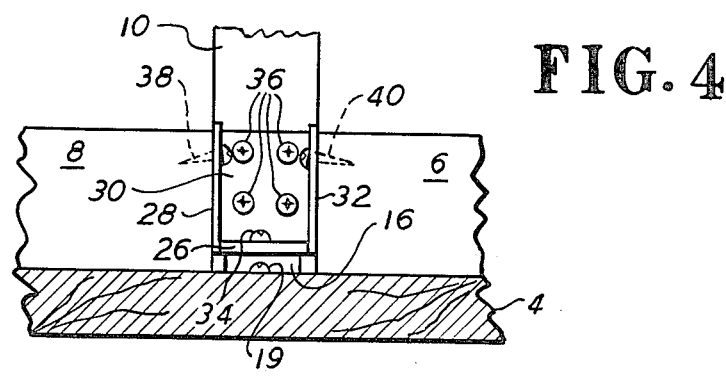
FIG. 4 is an elevational view taken in the direction of the arrows IV—IV of FIG. 3.

At its end each rail 6, 8 is cut at a 45° angle as viewed in plan (see FIG. 3) to provide respective miter edges 12, 14. The opposed adjacent miter edges 12, 14 thus formed are spaced apart to receive therebetween the leg 10 in a close fitting drive fit relationship.

The above described joint construction is conventional.

There may be provided means whereby the leg is dowelled to the top 4. For this purpose, there is provided a dowel plate 16 positioned in a recess 17 cut in the top of leg 10 so as to be flush with top of the leg, and secured to the leg by a screw 18 and to top 4 by a screw 19. A depending steel dowel rod 20 mounted on and rigid with plate 16 is received in press fitted relationship in a hole 22 of leg 10.

There will now be described the novel brace member of the invention, by which the top 4, rails 6 and 8, and leg 10 are all rigidly secured together. The brace member 24 comprises a base plate or bottom wall 26 and three depending flange plates or side walls 28, 30, and 32. It will be seen that the foregoing brace arrangement in essence provides a box-like structure. Base plate 26 forms the bottom wall of the box, depending plates or walls 28 and 32 form two opposed parallel sides thereof, and plate 30 forms one end wall thereof. The entire box-like brace member 24 is one rigid unit. In the embodiment shown, base plate or wall 26 and depending end wall 30 may be an integral right angle member, with plates or walls 28 and 32 welded along their upper edges to base plate 26 and along their vertical depending edges to the end wall 30. Integral base and end plates 26 and 30 may be steel approximately 3/16" thick steel, and side plates 28, 32 may be steel approximately 1/16" thick.

The various plates or walls making up brace member 24 are provided with suitable holes to receive various mounting screws as will be described below.

The box-like brace member 24 is employed as follows to provide the joint construction of the present invention. Base plate 26 abuts the dowel plate 16 and is secured to the underside of top 4 by two screws 34 which also extend through holes in the dowel plate. End plate 30 is secured to leg 10 by four screws 36. The two side plates 28 and 32 are each respectively secured to the side rails 8, 6 by screws 38, 40.

The joint construction of the present invention provides a particularly rigid joint. The box-like brace member 24, with its four walls each respectively secured to the top 4, rail members 6 and 8, and leg 10, provides a four-way tie among all the component members of the table or other furniture article 2, thereby providing a strong and rigid structure.

Although only one corner of the furniture article 2 has been shown and described herein, it should be understood that the construction at the other corners is identical.

If a leg 10 should be broken, replacing it is quite easy with the present joint construction. All that need be done is unscrew brace member 24 from the various components to which it is fastened, unscrew dowel plate 16 from leg 10 and remove the plate by extracting dowel pin 20 from the leg, and then substitute a new leg by reversing the foregoing steps.

While there has been shown and described in the foregoing specification and drawing a specific embodiment of the invention, it will be appreciated that the various principles and features of the invention are susceptible of numerous modifications and applications. Accordingly, it should be understood that the foregoing disclosure of a specific embodiment of the invention is intended to be illustrative and exemplary only, and in no way limitative of the following claims.

I claim:

1. In an article of furniture comprising a table, desk, or the like, a furniture joint construction comprising a plurality of furniture members of said article of furniture adapted to be secured together and brace means for securing said members together:

said brace means comprising a base member and a plurality of plate-like members secured to and extending away from said base member;

said base member and said plate-like members each respectively being secured to a different one of said furniture members;

dowel means extending into one of said furniture members; and a plate securing said brace means and said dowel means together, with said dowel means mounted to said plate.

2. The combination according to claim 1, wherein:
said brace means is substantially box-like in configuration;
said base member and plate-like members forming the walls of said box.

3. The combination according to claim 2, wherein:
said furniture members are disposed exteriorly of said box.

4. The combination according to claim 1, wherein:
said one furniture member into which said dowel means extends comprises a leg member of said article of furniture.

5. The combination according to claim 1, wherein:
said plate comprises a member and further comprises fastening means fastening said brace means and said member together and to said article of furniture.

6. The combination according to claim 5, wherein:
said member is independent of said brace means and is secured thereto solely by said fastening means.

7. The combination according to claim 6, wherein:
said fastening means extends through said brace means and said member into at least one of said furniture members in fastened relationship with the latter.

8. The combination according to claim 7, wherein:
said fastening means comprises screw means.

9. The combination according to claim 7, further comprising:
second fastening means for fastening said plate to said one furniture member into which said dowel means extends.

10. The combination according to claim 9, wherein:
said second fastening means comprises screw means.

* * * * *